Aug. 16, 1927.

G. WALKER 1,638,971

DISTANCE INDICATOR FOR SHIPS, ETC

Filed Jan. 25, 1923

Inventor:
George Walker
by Roberts, Roberts & Cushman
Attys.

Patented Aug. 16, 1927.

1,638,971

UNITED STATES PATENT OFFICE.

GEORGE WALKER, OF NEWTON CENTER, MASSACHUSETTS.

DISTANCE INDICATOR FOR SHIPS, ETC.

Application filed January 25, 1923. Serial No. 614,838.

This invention relates to a ship's instrument for counting during predetermined periods of time, such as each minute, the number of revolutions of a ship's propeller or propellers and the average number of revolutions of all the propellers, and for automatically indicating and recording, according to propeller speeds, the distance traveled by the ship whether at constant or varying speeds, the invention being in the nature of an improvement on the apparatus disclosed in my co-pending applications Serial No. 273,744, filed January 29, 1919 and Serial No. 319,392. filed August 23, 1919.

Objects of the invention are to provide an improved instrument for translating propeller speed into a distance indication, whether the propeller speed is constant or variable, to permit easy adjustment of such an instrument to conform to different ships and to different hull or load conditions of the same ship, and in general to render such devices more accurate and reliable in service and to overcome the defects of previous devices of this kind.

The invention comprises a distance indicator, a controlling member actuated in proportion to the number of propeller revolutions during predetermined periods of time, and connections between the controlling member and the distance indicator to cause the latter by movement of the former to measure the distance the ship has been driven whether at constant or varying speed. In the preferred form two controlling members alternately actuated during predetermined periods are employed to actuate the distance indicator. The controlling members may be in the form of wheels or discs provided with elements spaced to correspond to the distance the ship is driven at different speeds during the predetermined period, the spacing of the elements being irregular and determined by tests of the ship at various speeds.

For the purpose of making clear the nature and scope of the invention illustrative embodiments thereof are shown in the accompanying drawings, in which:—

Figure 1:
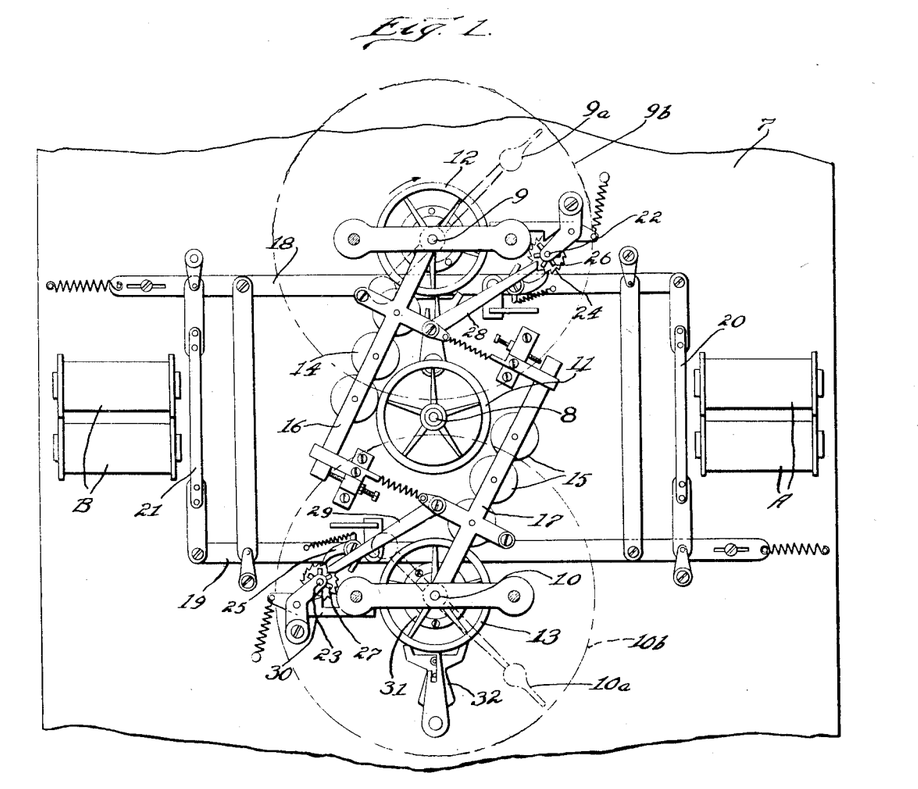
Fig. 1 is an elevational view of the mechanism behind the dials of a ship's instrument of the type described.

The parts shown in Fig. 1 comprise the mechanism directly behind the recording dials which are indicated by broken lines. Mounted in suitable bearings in the back or supporting plate 7 is a shaft 8 rotatable at the same speed as the ship's propeller or at a speed otherwise proportional thereto, or if several propeller are utilized, at a speed proportional to the average speed of such propellers, according to the disclosure of the aforesaid applications. In spaced relation to the shaft 8 are parallel shafts 9 and 10 adapted to be alternately driven from shaft 8, shaft 9 having a pointer or indicator $9^a$ and shaft 10 a pointer or indicator $10^a$, each indicated in dotted outline, adapted to be rotated across dials $9^b$ and $10^b$ suitably graduated so that the pointers may give an indication of the number of propeller shaft rotations within a given period such as one minute. The mechanism for alternately rotating the shafts 9 and 10 from shaft 8 comprises gear wheel 11 on shaft 8 arranged to drive gear wheels 12 and 13 on shafts 9 and 10 respectively through trains of gears 14 and 15 mounted on arms 16 and 17 pivoted for swinging movement about the axis of shafts 9 and 10 respectively. The gear wheels of trains of gears 14 and 15 are in mesh with one another and the inmost is in constant mesh with gear wheels 12 and 13 respectively. This gear mechanism is more fully described and claimed in copending application Sr. No. 614,834 filed on even date herewith.

To control the alternate operation of shafts 9 and 10, bars 18 and 19 are arranged to be reciprocated at predetermined intervals by magnets A and B respectively which act upon armatures 20 and 21. Each reciprocation of the bars 18 and 19 under the impulse of magnets A and B serves to step around shafts 22 and 23 by the provision of pawl and ratchet mechanism 24 and 25 on the bars and shafts respectively. Shafts 22 and 23 are provided with pinions having teeth 26 and 27 which act upon arms 28 and 29 fast upon arms 16 and 17 respectively to force the latter outwardly to disconnect trains of gears 14 and 15 from gear wheel 11.

The operation of the mechanism shown in Fig. 1 is as follows:

Shafts 9 and 10 are operated from shaft 8 during alternate periods of time such as alternate minutes. In the positions shown shaft 10 is stationary with pointer 10$^a$ indicating the number of revolutions made by the ship propeller during the preceding minute and shaft 9 is being rotated through its gearing to cause pointer 9$^a$ to count the number of revolutions of the propeller shaft during the current minute. A few seconds before the current minutes has expired, the magnet B actuates bar 19 to step around shaft 23 one tooth; arm 29 rides upon one of the teeth 27 on shaft 23 to continue to retain train of gears 15 out of mesh with gear wheel 11 and at the same time the lever or dog 30 releases a friction brake on shaft 10 (as disclosed in copending application Serial No. 614,835, filed on even date herewith) which is thereupon reset by any suitable mechanism such as a resetting spring in housing 31 adjacent the shaft (as disclosed in copending application Serial No. 614,837, filed on even date herewith). To prevent too rapid reverse movement of shaft 10 escape mechanism 32 may be provided. With shaft 10 reset and shaft 9 still counting the revolutions of the propeller, both magnets A and B are energized at the end of the current minute simultaneously to actuate bars 18 and 19 to step around shafts 22 and 23 the interval of another tooth, whereupon arm 28 rides upon one of teeth 26 disconnecting shaft 9 from shaft 8 so that shaft 9 is now stationary with pointer 9$^a$ giving an indication of the revolutions made by the propeller during the minute just ended. At the same instant arm 29 slips between two of teeth 27 permitting the outer gear of train 15 to mesh with gear wheel 11, thus throwing shaft 10 into operation to count the revolutions of the propeller. A few seconds before the minute is up magnet A again actuates bar 18 to rotate shaft 22 one tooth of the ratchet wheel to reset shaft 9. This sequence of operation continues indefinitely, each of shafts 9 and 10 alternately counting the number of revolutions of the propeller, three actuations of bars 18 and 19 being necessary to complete each cycle of operation.

Figures 2, 3, 4, 5:
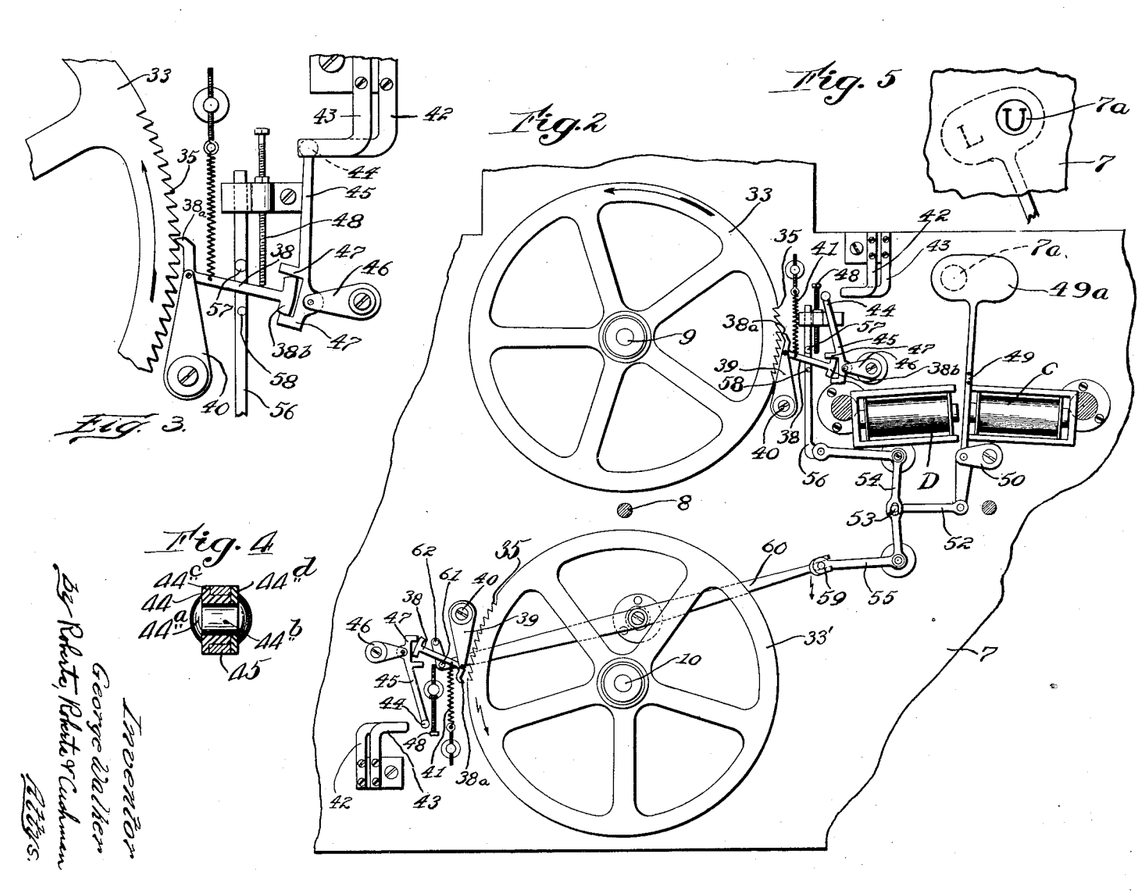
Fig. 2 is an elevational view of the mechanism on the side of the back-plate opposite to that shown in Fig. 1.
Fig. 3 is an enlarged detail view of certain of the mechanism shown in Fig. 2.
Fig. 4 is an enlarged view, partly in section, of one of the circuit closers.
Fig. 5 is a detail view of a portion of Fig. 2 viewed from the opposite side.
Figure 6:
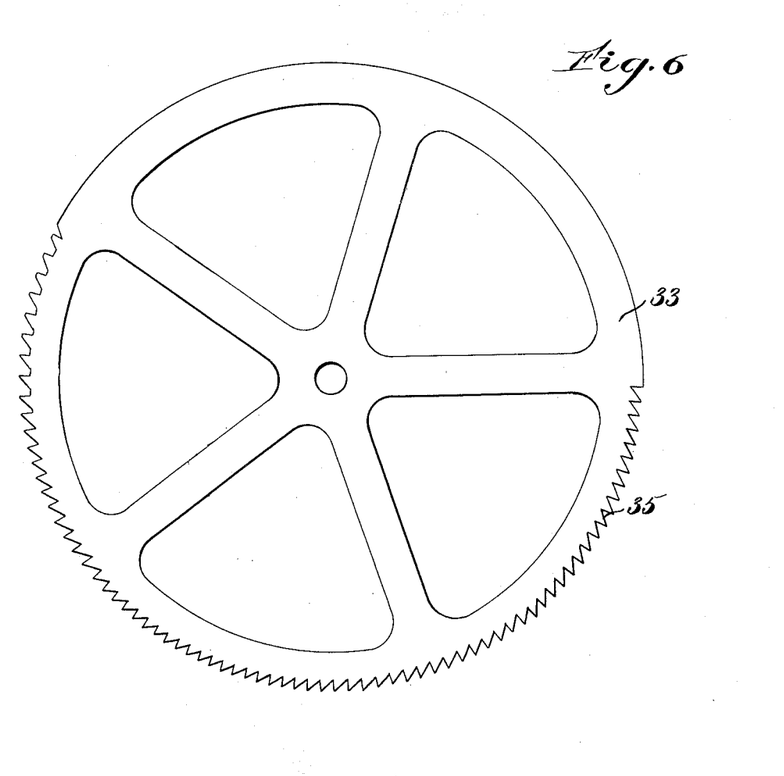
Fig. 6 is an enlarged side view of one of the controlling members or wheels shown in Fig. 2.

Reference will now be had to Fig. 2 for a disclosure of the reverse side of back plate 7 upon which is mounted the mechanism for translating the number of revolutions of the propeller shaft into a distance indication. This mechanism comprises revolution counter controlling members 33 and 33′ removably attached in any suitable manner to the shafts 9 and 10. These controlling members, which actuate the distance recorder by a mechanism which will presently be described, may take the form of identical discs or wheels provided with elements such as peripheral contacts in the form of teeth 35 cut in the edge thereof, each to indicate a certain distance traversed by the ship according to propeller speed. An enlarged view of one of these controlling members or tooth wheels is shown in Fig. 6. These controlling members are actuated alternately in the same manner as the indicators 9$^a$ and 10$^a$, the controlling members and indicators being mounted on the same shafts. Thus, one controlling member advances during one interval; at the end of the interval the controlling member stops and the other member starts from initial position; near the end of the next interval the first member is reset to initial position; at the end of the interval the second member stops and the first member starts; etc.

Obviously the controlling members advance during their operative intervals respectively angular distances proportional to the speed of the propeller or propellers, each angular distance corresponding to a particular propeller speed, and since each propeller speed will drive the ship a certain distance each angular distance corresponds to a certain distance traveled during the interval. Consequently by spacing the contacts on the controlling member so that for each angular movement per interval the distance indicator is actuated an amount representative of the distance corresponding to that angular movement, the distance indicator continually and automatically indicates the correct distance whether the speed remains constant or changes. A practical way of determining the spacing of the contacts for this purpose is disclosed in my prior application Serial No. 319,392.

Figure 12:
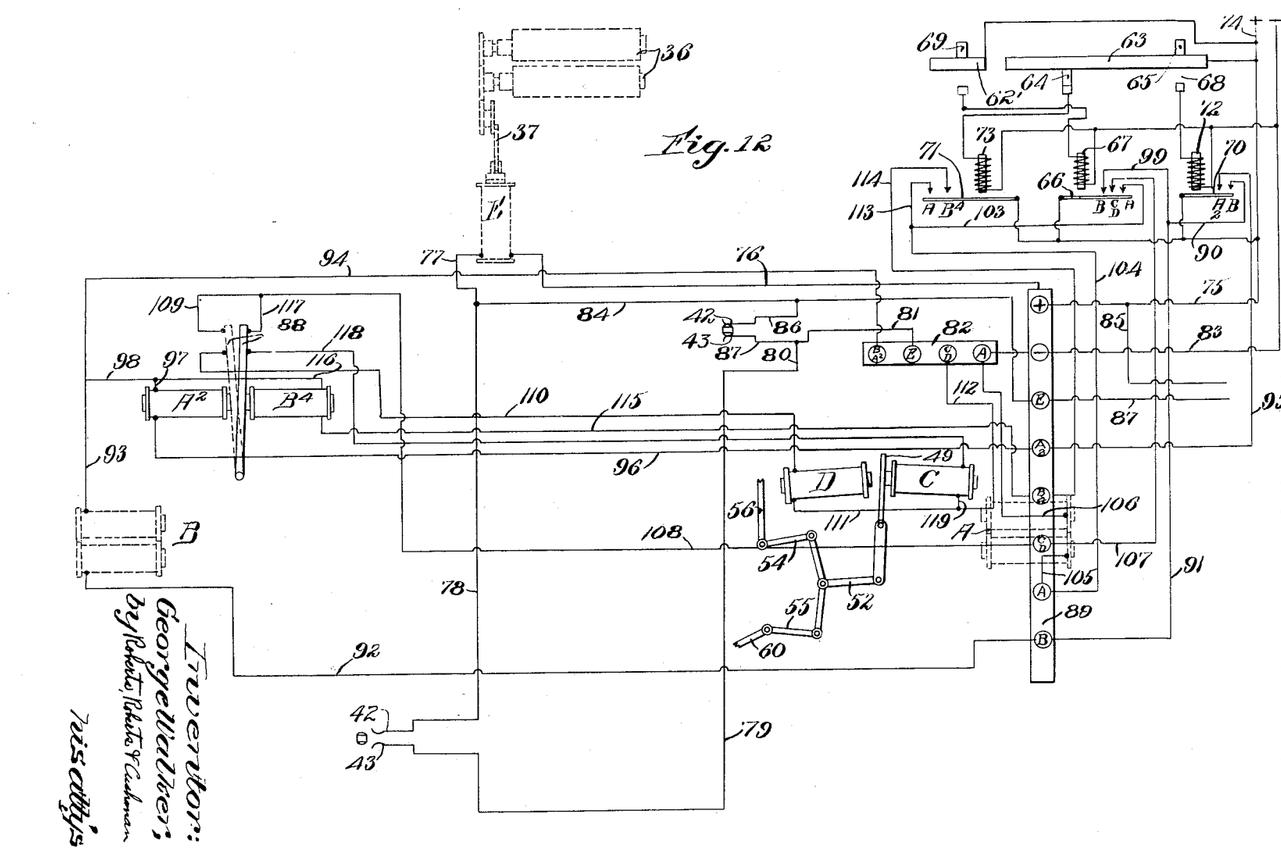
Fig. 12 is a circuit diagram of connections for the apparatus shown in Figs. 2 to 6.

The distance indicator or counter 36 adapted to be operated alternately by identical controlling members 33 and 33′ is diagrammatically indicated in rear elevation in Fig. 12 and may take the form of a counter of the well known Veeder type. The drawing shows two counters, one of which may serve as the counter for the total mileage covered by the ship and the other as a trip counter. Suitable ratchet and pawl mechanism 37 of the type disclosed in my copending application Serial No. 319,392 may serve to cooperate the counters 36, this mechanism being intermittently actuated by an electromagnet E.

One form of mechanism through which electromagnet E is actuated by controlling members 33 and 33′ is disclosed in detail in Figs. 2 and 3 and comprises levers 38 pivoted on fixed supports 40 fast upon back plate 7. The ends 38ª of levers 38 are normally held in contact with the teeth 35 on the controlling members through the action of springs 41 so that as shafts 9 and 10 rotate the teeth 35 move levers 38 in one direction, which movement is reversed by springs 41 after the apex of the tooth passes beyond the pawl end 38ª, so that levers 38 are caused to oscillate. This oscillatory movement is made use of intermittently to close electrical circuits leading from spaced spring contacts or switches 42 and 43, the circuits being closed across the contacts by circuit closers 44 and levers 45 pivoted to brackets 46 on back plate 7. Levers 45 and levers 38 have interengaging parts comprising a double cam head 38ᵇ (Fig. 3) acting upon spaced cam projections 47 on lever 45 whereby the oscillatory movement of levers 38 is communicated to levers 45. A suitable form of circuit closer 44 is shown in detail in Fig. 4 and comprises a conductor member 44ª preferably of metal extending through an opening 44ᵇ in arm 45 from which it is insulated by a bushing 44ᶜ and a washer 44ᵈ of suitable insulating material, these insulating members being retained in place by heading over the projecting portions of the conductor member 44ª. These headed over portions are preferably rounded as shown in Fig. 4 so that when the circuit closer 44 is forced between the spring contact switches 42 and 43 it has a wedging action whereby the contacts grip the conducting member 44ª and prevent double closings of the circuit through rebound of lever 45 or 38 or both. If desired adjusting screws 48 may be provided to limit the throw of lever 38 and to adjust for wear.

In order that shafts 9 and 10 may be reset as described mechanism must be provided for holding ends 38ª of lever 38 out of contact with teeth 35 during the resetting operation. Since shafts 9 and 10 are alternately in operation and alternately reset, the mechanism provided must be such that one lever 38 is always operative and the other always inoperative. One method and apparatus for achieving this result is disclosed in Fig. 2 and comprises a lever 49 pivoted to bracket 50 and serving as an armature for magnets C and D. The lower end of the lever 49 is pivotally connected to a link 52 which has a pin 53 in its free end working in slots in the short arms of bell-crank levers 54 and 55. The other arm of bell-crank lever 54 actuates a slide 56 having spaced pins or stops 57 and 58 thereon, pin 58 serving to prevent double ended cam 38ᵇ from rebounding beyond lower cam projection 47 on lever 45 in the position of the parts shown, and pin 57 serving to hold lever 38 inoperative when control lever 49 is swung to the left. The other end of bell-crank lever 55 has a pin 59 operating in a slot in one end of the lever 60, the opposite end of which has spaced pins or stops 61 and 62 in all respects similar to stops 57 and 58 and for the same purpose. In the position of the parts shown in Fig. 2, which corresponds to the position of the parts shown in Fig. 1, shaft 10 is not in operation but is about to be reset, hence stop 61 is retaining lower lever 38 out of contact with controlling member 33′. Since one of levers 38 must be constantly in operation in order that a continuous distance record may be made magnets C and D are alternately actuated at the close of each of the predetermined periods during which shaft 9 or shaft 10 is actuated. As shown in Figs. 2 and 5, the lever 49 may carry at its upper end a shutter 49ª having on its forward face the letters L and U which are alternately visible through the window 7ª in panel 7, the U being visible when the upper set of mechanism is operating and the L being visible when the lower set of mechanism is operative.

Figures 7, 8, 9:
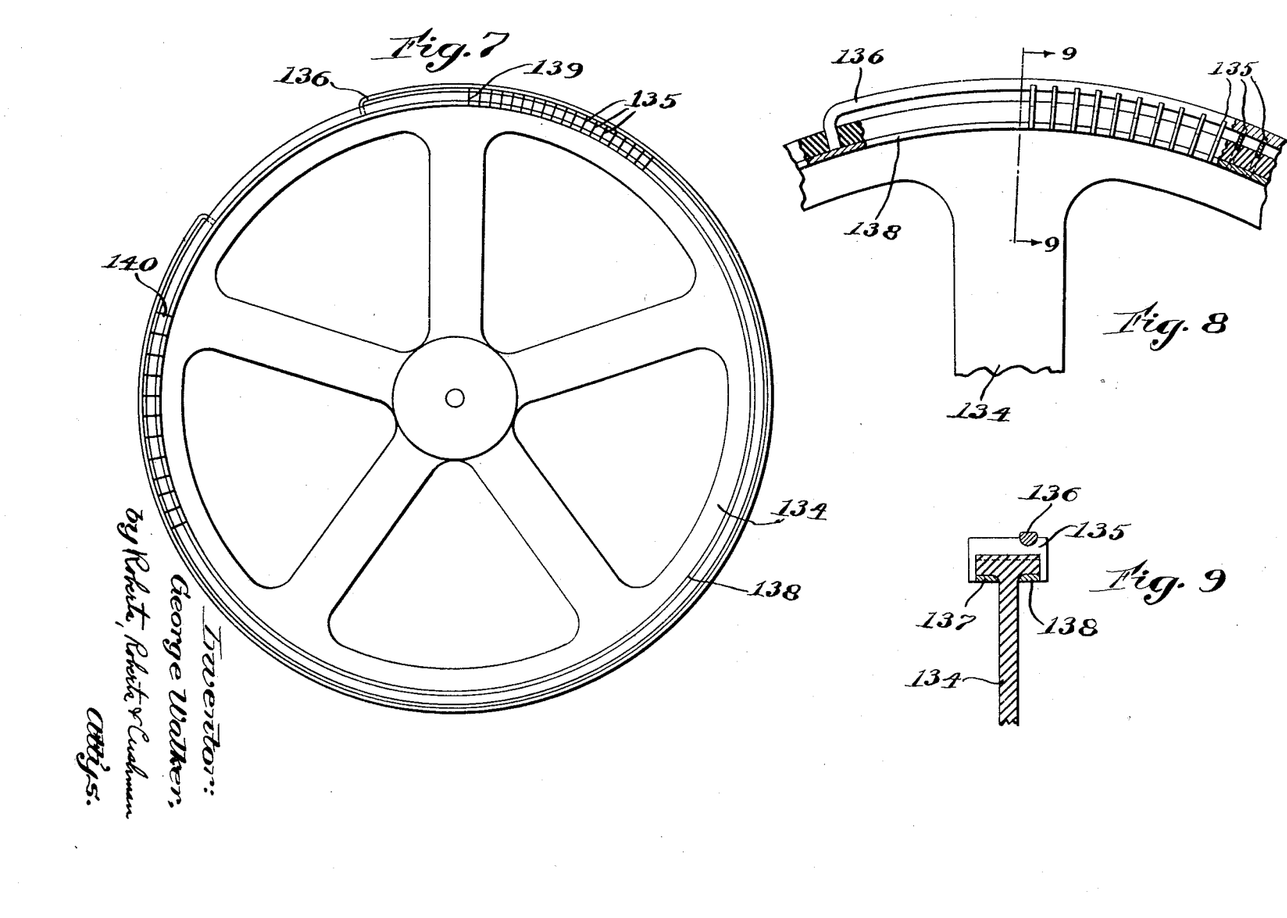
Fig. 7 is a similar view of a modified form of wheel.
Fig. 8 is a detail view of a portion of the wheel shown in Fig. 7.
Fig. 9 is a section on line 9—9 of Fig. 8.
Figures 13, 14:
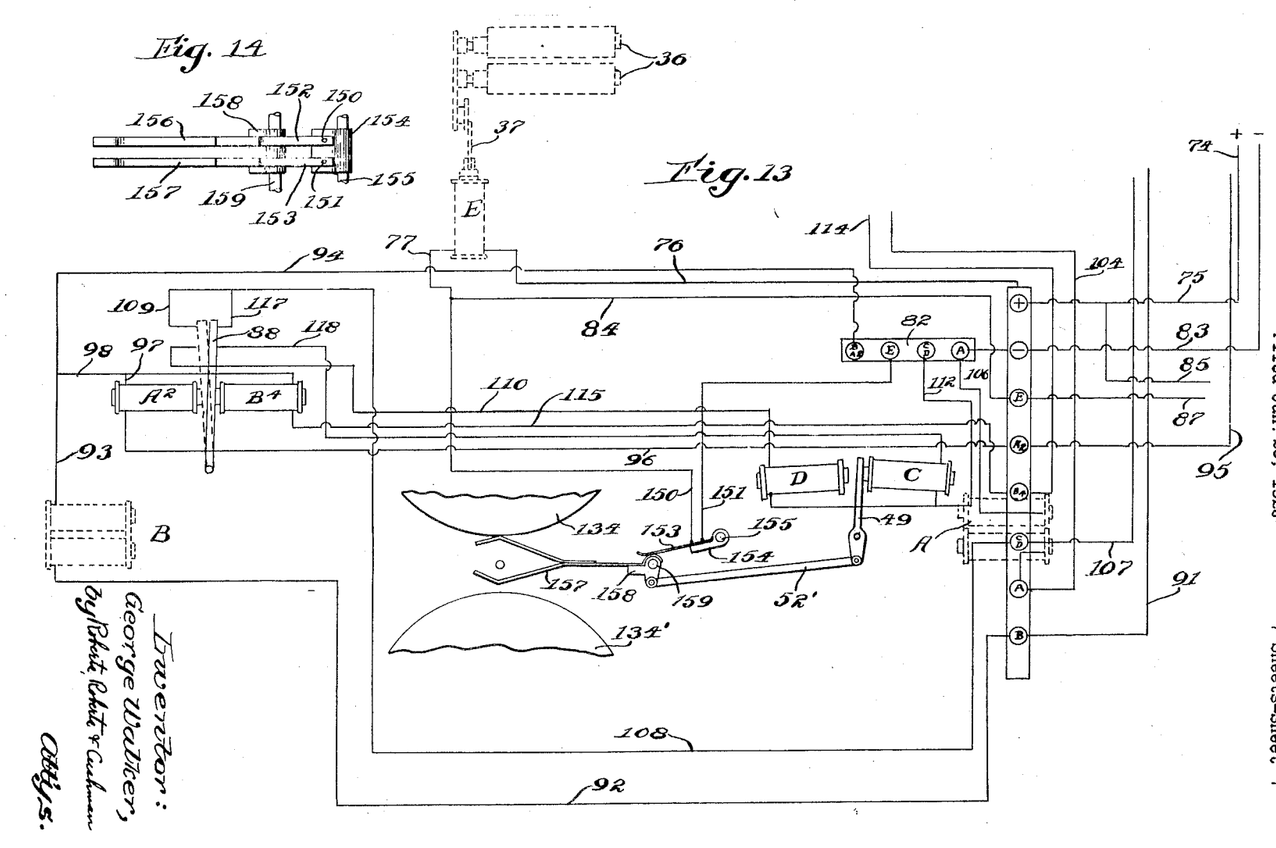
Fig. 13 is a similar diagram for the modification shown in Figs. 7 to 9.
Fig. 14 is a detail view of a contact device shown in Fig. 13.

The preferred form of controlling member shown in Figs. 7, 8 and 9 comprises a wheel 134 of bakelite or other insulating material, carrying on its periphery a series of electrical contacts 135, beginning at 139 and ending at 140 (Fig. 7), and a circumferential contact wire or bar 136. The contacts 135 are U-shaped and fit in grooves extending transversely across the periphery of the wheel and thence radially across the peripheral flanges of the wheel. The ends of the U-shaped contacts may be soldered to rings 137 and 138, respectively, which fit under the wheel rim as shown in Fig. 9. The contact bar 136 lies in grooves in the contacts 135 and the ends extend radially inwardly through the wheel rim to ring 138. The bar 136 may be soldered or welded to the contacts 135 and the ends of the bar may be soldered or welded to the ring 138. The series of contacts 135 are distributed in accordance with the relationship between propeller speeds and distances traveled of the particular ship upon which the wheel is to be used in the same manner as the contacts 35 on wheel 33. A method of actuating the distance indicator with wheels such as shown in Figs. 7 to 9 is illustrated in Fig. 13 hereinafter described.

An electrical system suitable for use with the apparatus shown in Figs. 1 to 6, is illustrated in Fig. 12. This being a diagrammatic view from the back of plate 7, only sufficient of the linkage connecting the operating mechanism for giving a distance indication is shown as will serve to indicate the position of the switches 42—43 in the circuits to the distance counter magnet E, and the distance counter 36 and its magnet E as well as magnets A and B which control the actuation of bars 18 and 19 being indicated by broken lines inasmuch as they are on the front face of plate 7. The shafts 62' and 63, indicated at the upper right-hand corner of Fig. 12, are driven at constant speed by a chronometer or other suitable means, the shaft 62' making one revolution during each of the aforesaid intervals of operation of the revolution counters (e. g. one revolution per minute) and the shaft 63 making one-half revolution during each such interval. Shaft 62' carries a contact 69 which closes circuit to magnet 67 thus energizing the magnet once each interval. The shaft 63 carries two opposite contacts 64 and 65 which alternately close circuits through relays 73 and 72, respectively, thus energizing one of these two relays once each interval. When the relay 67 is energized at the end of each interval one indicator (9ª or 10ª, Fig. 1) and one control member (33 or 33', Fig. 2) is started and the other is stopped. The relays 72 and 73, which reset the lower and upper sets of mechanism, respectively, should operate a few seconds before the end of alternate intervals; consequently the contacts 64 and 65 are so positioned on shaft 63 that they close circuit, respectively, a few seconds before contact 69 on shaft 62' closes circuit to relay 67.

Thus at the end of each interval relay 67, through armature 66 closes the circuit of magnet A (conductors 66, 74, 103, 104, 105, 106 and 83), the circuit of magnet B (conductors 74, 66, 99, 91, 92, 93, 94, 82 and 83), and the circuit of either magnet C or magnet D depending upon the position of armature 88 (conductors 74, 66, 107, 108, 109 or 117, 110 or 118, 111 or 119, 112, 82 and 83). A few seconds before the end of each alternate interval relay 72, through armature 70 closes the circuit of magnet A² (conductors 74, 70, 95, 96, 97, 98, 94, 82 and 83) and also the circuit of magnet B (conductors 74, 70, 90, 91, 92, 93, 94, 82 and 83). A few seconds before the end of each intervening interval relay 73, through armature 71, closes the circuit of magnet A (conductors 74, 71, 113, 104, 105, 106 and 83) and also the circuit of magnet B⁴ (conductors 74, 71, 114, 115, 116, 98, 94, 82 and 83). Thus, magnets A and B operate at the end of each interval, one to stop and one to start its mechanism; magnets C and D respectively operate at the end of alternate intervals, to throw lever 49 (Fig. 2) back and forth; magnets A and B are again respectively operated just before the ends of alternate minutes to reset their associated revolution counters and distance controllers; and magnets A² and B⁴ are likewise respectively operated just before the ends of alternate intervals to condition the circuits of magnets C and D respectively for closing at the ends of alternate intervals.

The switches 42—43 of Fig. 2, which are shown diagrammatically in Fig. 12, are connected in parallel to distance magnet E, one switch connecting through conductors 86, 84, 77, 76, 75, 74, 83, 82, 81 and 87 and the other switch connecting through conductors 78, 77, 76, 75, 74, 83, 82, 81, 80 and 79.

When using control wheels such as shown in Figs. 7 to 9 the circuit arrangement may be similar to that above described as illustrated in Fig. 13 where corresponding parts are designated as in Fig. 12. In Fig. 13, 134 and 134' are wheels such as shown in detail in Figs. 7 to 9, the wheels operating alternately as in Fig. 12. A pair of contact springs 156—157 (Fig. 14) are mounted on an insulation block 158 pivoted on shaft 159 supported in bearings not shown. The block 158 is connected to lever 49 (Fig. 13) by a link 52' so that when the magnet C is energized the spring contacts 156 and 157 engage the upper wheel 134 and when the magnet D is energized the contacts engage lower wheel 134'. The spring contacts are continuously connected to conductors 150 and 151 respectively by spring connectors 152 and 153 (Fig. 14) mounted on insulation block 154 suitably supported at 155. The spring contacts 156 and 157 are so positioned that one slides on the conducting bar 136 (Figs. 7 to 9) and the other wipes over contacts 135, leaving each contact before engaging the next succeeding contact. Thus the magnet E is energized once for each contact engaged by springs 156, the circuit comprising conductors 74, 75, 76, 77, 150, springs 152 and 156, (Figs. 13 and 14) a contact 135 (Fig. 7 to 9), bar 136, springs 157 and 153 (Figs. 13 and 14) and conductors 151, 82 and 83. The wheels 134 and 134' function during alternate intervals of time, continually to actuate magnet E.

Apparatus according to the present invention can be used on any ship having the same number of propellers by merely changing the control wheels 33 or 134, each ship requiring wheels on which the contacts are distributed in accordance with the relation between the distance traveled at various propeller speeds, this relationship being predetermined by test or other suitable manner, For a single propeller ship the wheels 33 or 134 are mounted on shafts which rotate at speeds equal to or otherwise proportional to the speed of the single propeller, and for multi-propeller ships the wheels are mounted on shafts which rotate at speeds proportional to the average speed of all the propellers in use as disclosed in Serial No. 319,392. Suitable mechanism for averaging the speed of three or more propellers is shown in Serial No. 614,840 filed on even date herewith. Other mechanism suitable for use in the apparatus herein described is disclosed in Sr. No. 614,836, Sr. No. 614839, Sr. No. 614841 and Sr. No. 614,842, all filed on even date herewith.

Figures 10, 11:
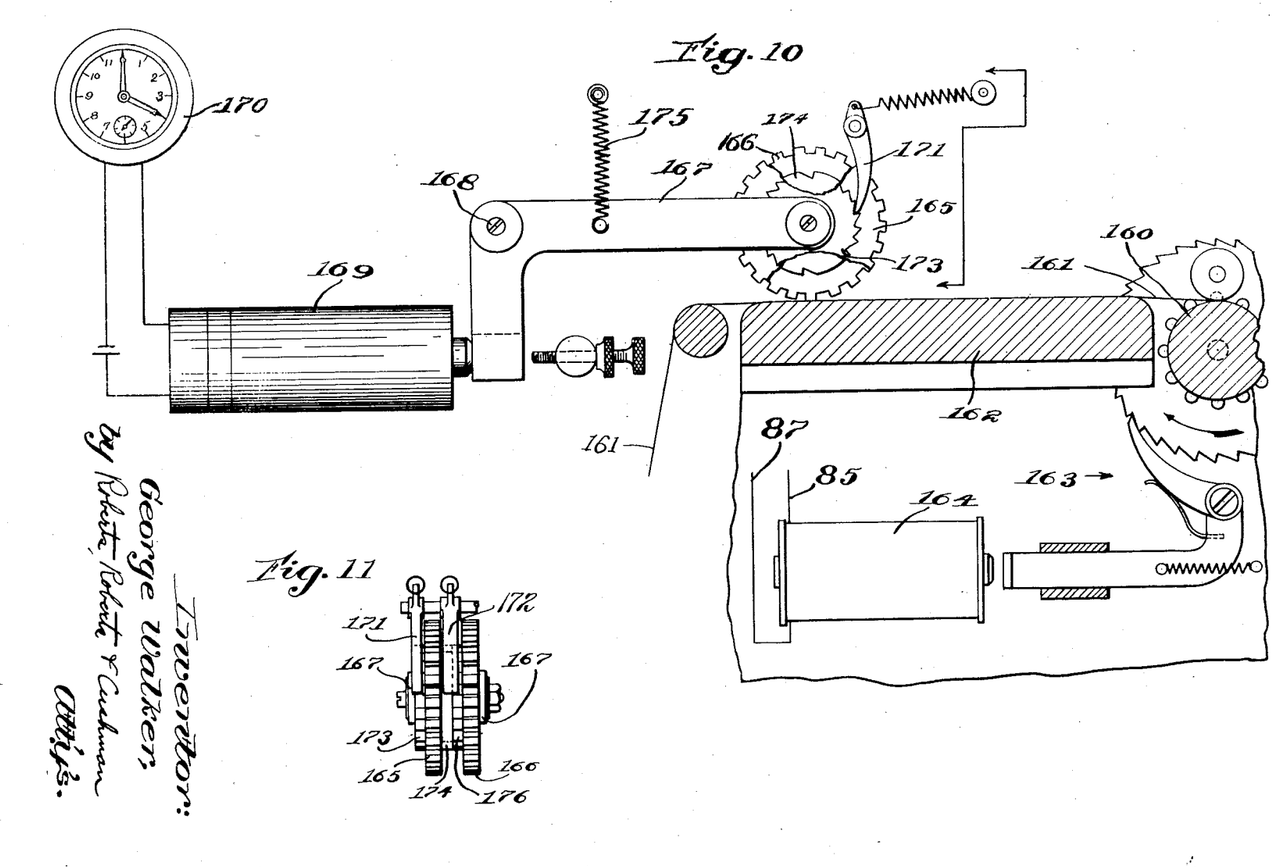
Fig. 10 is an elevational view, parts being sectioned, showing means for continually recording the distance traveled.
Fig. 11 is a detail of the means shown in Fig. 10.

The conductors 85 and 87 of Figs. 12 and 13 may lead to direction recording mechanism as disclosed in Sr. No. 614,839 filed on even date herewith, or to other mechanism which it is desired to operate proportionately to the distance traveled. Thus in Figs. 10 and 11 is illustrated means for recording the distance traveled, this means comprising a roller 160 for advancing an elongate record sheet or strip 161 over a table 162, pawl and ratchet mechanism 163 for actuating roller 160, the pawl being operated by magnet 164 connected in circuit 85—87 (Figs. 12 and 13), and means for marking the record sheet at timed intervals. The marking means shown in Figs. 10 and 11 comprise two number wheels 165 and 166 pivotally mounted in the end of bell-crank 167 pivoted at 168, and a magnet 169 controlled by chronometer 170 for actuating the bell-crank at timed intervals. If it is desired to print the time on the record sheet 161 every five minutes for example, wheel 165 may be provided with two series of numbers from 5 to 60 (5, 10, 15, etc.) and the wheel 166 with a single series from 1 to 24 (1, 2, 3, etc.), the magnet 169 being energized at the end of each five minutes. As shown in Fig. 11, the pawl 171 engages ratchet 173 fast to wheel 165 and the pawl 172 engages ratchet 176 on wheel 166, a cam 174 fast to wheel 165 serving to hold the pawl 172 out of engagement with ratchet 176 except at each twelfth rise of bell-crank 167. Thus, the wheel 165 is turned one step every time it rises and the wheel 166 is turned one step each twelfth time the wheels are lifted by spring 175, thereby marking the record sheet every five minutes as follows: 0:05, 0:10, 0:15,—23:50, 23:55, 0. Inasmuch as the record strip is driven at a rate proportional to the speed of the ship whether constant or variable (e. g. an inch to the mile) the distance between any two time markings indicates the distance traveled in the interim, the sheet preferably having transverse lines an inch apart; and inasmuch as the speed of the ship is a function of the time and distance, the speed of the ship during any interval may be determined from the record sheet. The number wheels may mark the record sheet by imprint, by using an automatic ink-roll, or by the use of an ink ribbon as in copending application Sr. No. 614,839, filed on even date herewith.

In using ship's instruments according to this invention it is intended that each ship have several sets of contact wheels (such as 33 or 134) made to conform to varied conditions under which the ship may sail in order that the distance indication may be truly accurate and reliable. These sets may conform to the speed of the ship as influenced by its draft when fully loaded, partly loaded, or light; also as influenced by the condition of the hull as when clean or when foul with marine growths. In case of high winds, tides, etc., which change the ratio between the propeller speed and distance traveled the contact wheels may be changed to correspond to the changed ratio or the error may be calculated from the wind or tide velocity and direction and the propeller speed, the instrument constantly indicating the propeller speed and continuously recording the distance traveled according to propeller speed and accuracy.

Herein, I have used the term propeller generically to include either a single propeller or a multiple propeller, such as a twin, triple, etc., screw ship is provided with, and the word is to be thus broadly construed unless otherwise limited either specifically or by context. Likewise the term ship is to be construed as including either air or water craft or indeed any body having propellers.

What I claim is:

1. A ship's instrument comprising an indicator, and mechanism for actuating said indicator including a movable part and a cooperating part, the movable part having control elements distributed therealong successively to move into operative relationship with the other part, said control elements being spaced in accordance with the relation between the speed of the propeller and the velocity of the ship throughout a range of propeller speeds.

2. A ship's instrument comprising an indicator, and mechanism for actuating said indicator including a movable part and a cooperating part, the movable part having contacts distributed therealong successively to move into operative relationship with the other part, said contacts being variably spaced in accordance with the relation between the speed of the propeller and the velocity of the ship throughout a range of propeller speeds.

3. A ship's instrument comprising mechanism for indicating a ship's travel, said mechanism including a movable part and a cooperating part, the movable part having electrical contacts distributed therealong in accordance with the relation between the speed of the propeller and the velocity of the ship throughout a range of propeller speeds, and the other part being associated with said electrical contacts recurrently to close circuit in response to movement of the movable part, and means to move the movable part in accordance with the propeller speed.

4. A ship's instrument comprising a distance indicator, mechanism controlled by the revolutions of the propeller to move proportionately to the number of revolutions of the propeller during a predetermined period of time, electrical mechanism for operating the distance indicator, a series of electrical contacts therefor, and an element adapted to engage said electrical contacts successively, to operate the distance indicator, said electrical contacts being movable in proportion to the propeller revolutions and being spaced to correspond to the distance the ship is driven during said predetermined period of time at constant or varying speed.

5. A ship's instrument comprising a distance indicator, a revolution counter, mechanism controlled by the revolutions of the propeller to actuate the revolution counter proportionately to the number of revolutions of the propeller during a predetermined period of time, mechanism for operating the distance indicator, a series of controlling elements therefor, and a part adapted to cooperate with the controlling elements successively, to operate the distance indicator, said controlling elements being movable in response to the revolution counter mechanism and being spaced to correspond to the distance the ship is driven during said predetermined period of time at constant or varying speed.

6. A ship's instrument comprising a distance indicator, a revolution counter, mechanism controlled by the revolutions of the propeller to actuate the revolution counter proportionately to the number of revolutions of the propeller during a predetermined period of time, electrical mechanism for operating the distance indicator, a series of electrical contacts therefor, and an element adapted to engage said electrical contacts successively to operate the distance indicator, said electrical contacts being movable in response to said counter mechanism and being spaced to correspond to the distance the ship is driven during said predetermined period of time at constant or varying speed.

7. A ship's instrument comprising a distance indicator, two controlling members therefor alternately actuated during predetermined periods of time in proportion to the number of the propeller revolutions, two sets of members actuated by said controlling members respectively, and connections between said members and said distance indicator whereby the latter is actuated automatically by movement of the former to register the distance travelled at any or varying propeller speed.

8. A ship's instrument comprising a distance indicator, two movable members alternately actuated by the revolutions of the propeller during predetermined periods of time, said members having contacts, two elements arranged to be engaged by the contacts on said members respectively, and means controlled by said elements for actuating said distance indicator automatically to register the distance the ship is driven.

9. A ship's instrument comprising a distance indicator, a controlling member therefor actuated in proportion to the number of the propeller revolutions, electrical apparatus including an electromagnet for operating the distance indicator, a circuit closer adjacent said member, and means on said member for recurrently engaging said circuit closer at non-uniform intervals to cause said magnet to actuate said distance indicator to register the distance traversed by the ship.

10. A ship's instrument comprising a distance indicator, mechanism controlled by the revolutions of the propeller to move proportionately to the number of revolutions of the propeller during a predetermined period of time, mechanism for operating the distance indicator, an element for controlling said last-named mechanism, a rotary member actuated by said first-named mechanism and having spaced means for recurrently engaging said element thereby to translate the revolutions of the propeller during said predetermined period of time into a distance indication irrespective of the speed of the ship.

11. A ship's instrument comprising a distance indicator, mechanism controlled by the revolutions of the propeller to move proportionately to the number of revolutions of the propeller during predetermined periods of time including a wheel having spaced contacts on the periphery thereof, and mechanism for operating the distance indicator including an arm having one end normally in contact with the periphery of said wheel, whereby said arm is recurrently engaged to cause said distance indicator to indicate the distance traversed by the ship.

12. A ship's instrument comprising a distance indicator, mechanism controlled by the revolutions of the propeller to move proportionately to the number of revolutions of the propeller during a predetermined period of time, including a wheel having peripheral contacts spaced to correspond to the distance the ship is driven during said predetermined period irrespective of the speed of the ship, and mechanism for operating the distance indicator including an arm, and means maintaining one end of the arm in contact with said contacts, whereby to cause said distance indicator to register the distance the ship is driven.

13. A ship's instrument comprising a distance indicator, mechanism controlled by the revolutions of the propellers including two members arranged to move proportionately to the number of revolutions of the propellers during alternate predetermined periods of time, elements on said members spaced to correspond to the distance the ship is driven during said predetermined periods irrespective of the speed of the ship, and means associated with said members respectively for operating said distance indicator to register the distance the ship is driven.

14. In a ship's instrument speed-controlled mechanism controlled by the revolutions of the propeller to move proportionately to the number of revolutions of the propeller during a predetermined period of time, said mechanism including a rotary member having elements thereon spaced to correspond to the distance the ship is driven during said predetermined period irrespective of the speed of the ship.

15. In a ship's instrument speed-controlled mechanism controlled by the revolutions of the propeller to move proportionately to the number of revolutions of the propeller during a predetermined period of time, said mechanism including an oscillating element having contacts thereon spaced to correspond to the distance the ship is driven during said predetermined period irrespective of the speed of the ship.

16. In a ship's instrument, an oscillating member having elements non-uniformly disposed along the periphery thereof to correspond to the distance the ship is driven at different speeds, and means for moving said member in proportion to the number of propeller revolutions.

17. In a ship's instrument, a member having contacts non-uniformly spaced around the periphery thereof to correspond to the distance the ship is driven during a predetermined period of time at different speeds and means for moving said member during predetermined periods of time in proportion to the number of propeller revolutions.

18. In a ship's instrument, distance indicating means, actuating means movable in proportion to the ship's propeller speed, and control means for automatically adapting the operative relation between said actuating and indicating means to different propeller speeds, said control means comprising an oscillating member constructed in accordance with the varying ratio between propeller speed and distance traveled.

19. In a ship's instrument, distance indicating means, actuating means movable in proportion to the ship's propeller speed, and control means for automatically adjusting the operative relation between said actuating and indicating means to different propeller speeds, said control means comprising a rotary member having its periphery shaped in accordance with the varying ratio between propeller speed and distance traveled.

20. A ship's instrument comprising a distance indicator, mechanism controlled by the revolutions of the propellers including two members arranged to move proportionately to the number of revolutions of the propellers during alternate periods of time, said members constructed in accordance with the varying ratio between propeller speed and distance traveled, and means associated with said members respectively for operating said distance indicator to register the distance the ship is driven.

Signed by me at Boston, Massachusetts, this 27th day of December, 1922.

GEORGE WALKER.